United States Patent [19]

Bucher et al.

[11] Patent Number: 5,687,350

[45] Date of Patent: Nov. 11, 1997

[54] PROTOCOL AND SYSTEM FOR PERFORMING LINE-FILL ADDRESS DURING COPY-BACK OPERATION

[75] Inventors: Timothy Bucher, Los Altos; Douglas Christopher Hester, Milpitas; John Victor Sell, Los Altos, all of Calif.; Cang N. Tran, Austin, Tex.

[73] Assignee: International Business Machines Corporation, Armonk, N.Y.

[21] Appl. No.: 386,978

[22] Filed: Feb. 10, 1995

[51] Int. Cl.⁶ ............................................. G06F 12/00
[52] U.S. Cl. ............................................. 395/467; 395/445
[58] Field of Search ............................................. 395/445, 450, 395/460, 464, 467, 470

[56] References Cited

U.S. PATENT DOCUMENTS

| | | | |
|---|---|---|---|
| 4,084,231 | 4/1978 | Capozzi et al. | 395/444 |
| 4,884,197 | 11/1989 | Sachs et al. | 395/450 |
| 5,148,536 | 9/1992 | Witek | 395/467 |
| 5,226,130 | 7/1993 | Favor | 395/375 |
| 5,247,642 | 9/1993 | Kadlec et al. | 395/403 |
| 5,247,643 | 9/1993 | Shottan | 395/470 |
| 5,275,216 | 1/1994 | Moyer et al. | 395/450 |
| 5,353,426 | 10/1994 | Patel | 395/445 |
| 5,353,429 | 10/1994 | Fitch | 395/445 |
| 5,355,467 | 10/1994 | MacWilliams et al. | 395/473 |
| 5,471,602 | 11/1995 | DeLano | 395/445 |
| 5,499,355 | 3/1996 | Krishnamohan | 395/464 |

OTHER PUBLICATIONS

The Cache Memory Book, Jim Handy (c) 1993 ISBN: 0-12-322985-5.

IBM Technical Disclosure Bulletin, vol. 35, No. 6, Nov. 1992, "Interoperability Between MVS and Posix Functions".

IBM Technical Disclosure Bulletin, vol. 37, No. 06A, Jun. 1994, "Memory Queue Priority Mechanism for a Risc Processor".

Primary Examiner—Tod R. Swann
Assistant Examiner—Christopher S. Chow
Attorney, Agent, or Firm—Michael A. Davis; Andrew J. Dillon

[57] ABSTRACT

A protocol and system for providing a next read address during an address phase of a write transaction in a data cache unit in a processing unit is disclosed. The processing unit includes the data cache unit and an instruction cache unit both coupled to an address bus and a data bus, respectively. The two buses are further connected to a system memory controller separate from the microprocessor. The protocol and system provide for next read address and a next transaction during the address phase in a current write transaction. The protocol loads a pre-fetched address within a current data transaction and then generates a next line fill address using the pre-fetched address which is concatenated to the current data transaction. The pre-fetched address is used to generate a next line fill address. The line fill address is generated upon determining if a cache read miss has occurred and if so, copying a modified cache line back to the main system memory and then loading the missed cache read line into the internal cache from the system memory controller.

10 Claims, 3 Drawing Sheets

PROTOCOL AND SYSTEM FOR PERFORMING LINE-FILL ADDRESS DURING COPY-BACK OPERATION

BACKGROUND OF THE INVENTION

1. Technical Field

The present invention relates in general to data storage systems, more specifically, to data storage systems having a cache unit internal to the processing unit. More specifically still, the present invention relates to a memory management system in a processing system that provides next read transactions address during a write transaction.

2. Description of the Related Art

Many computer systems today include several levels of memory storage that attempt to fill the conflicting needs of the computer system. For example, computer systems are designed to operate very fast and memory is needed to operate at the same speed as the processing unit used within the computer system. Unfortunately, the cost of fast memory elements approach those of the cost of the microprocessor itself, thus, driving up the cost of the system overall if the fastest memory available is to be used. A compromise is to use slower but less expensive memory units for specific applications. One such application is to use slower dynamic ram memory for holding information temporarily before the processor unit needs to use it. Another alternative is to use a fast, but small and expensive, caching unit that operates at the same speed as the processing unit. Since this caching unit is small in comparison to the larger short-term memory, it is inexpensive to add with respect to the overall cost of the computer system. Lastly, a very large long-term storage unit is usually supplied, such as a hard disk drive, which is relatively inexpensive compared with the other types of memory.

Unfortunately, having different types of memory and different sorts of memory locations causes management problems for the memory controller to maintain the most current and accurate data needed or processed by the processing unit or any other resource connected to the computing system, such as a peripheral device. Accordingly, the processing system must maintain memory coherency among the various types of memory units used.

The primary objective of a coherent memory system is to provide the same image of memory to all devices using the system. Coherency allows synchronization and cooperative use of shared resources, otherwise, multiple copies of a memory location, some containing stale values, could exist in a system resulting in errors when the stale values are used. Each potential bus master within the system must follow rules for managing the state of its cache.

One type of cache coherency protocol is a coherent subset of the standard MESI four-state protocol that omits the shared state. Since data cannot be shared, the processor signals all cache block fills as if they were write misses (read-with-intent-to-modify), which flushes the corresponding copies of the data in all caches external to the processor prior to the processor's cache block fill operation.

To maintain coherency, the processor performs a memory system read operation to the internal cache on an internal read transaction miss. Once a miss has occurred, data must be loaded from one memory system into the internal cache. Following the read transaction, then the address buffers must be loaded for a next transaction. The separation of the events of the read load and then finding the next transaction address slow down system performance.

Accordingly, what is needed is a method for managing data in a caching memory system that is able to load next read transaction address buffers simultaneously during a system memory read transaction to internal cache in the microprocessing unit.

SUMMARY OF THE INVENTION

It is therefore one object of the present invention to provide an improved data storage systems.

It is another object of the present invention to provide an improved data storage systems having a cache unit internal to the processing unit.

It is yet another object of the present invention to provide an improved memory management system in a processing system that provides next read transactions address during a write transaction.

The foregoing objects are achieved as is now described. According to the present invention, a protocol and system for providing a next read address during an address phase of a write transaction in a data cache unit in a processing unit is disclosed. The processing unit includes the data cache unit and an instruction cache unit both coupled to an address bus and a data bus, respectively. The two buses are further connected to a system memory controller separate from the microprocessor. The protocol and system provide for next read address and a next transaction during the address phase in a current write transaction. The protocol loads a pre-fetched address within a current data transaction and then generates a next line fill address using the pre-fetched address which is concatenated to the current data transaction. The pre-fetched address is used to generate a next line fill address. The line fill address is generated upon determining if a cache read miss has occurred and if so, copying a modified cache line back to the main system memory and then loading the missed cache read line into the internal cache from the system memory controller.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
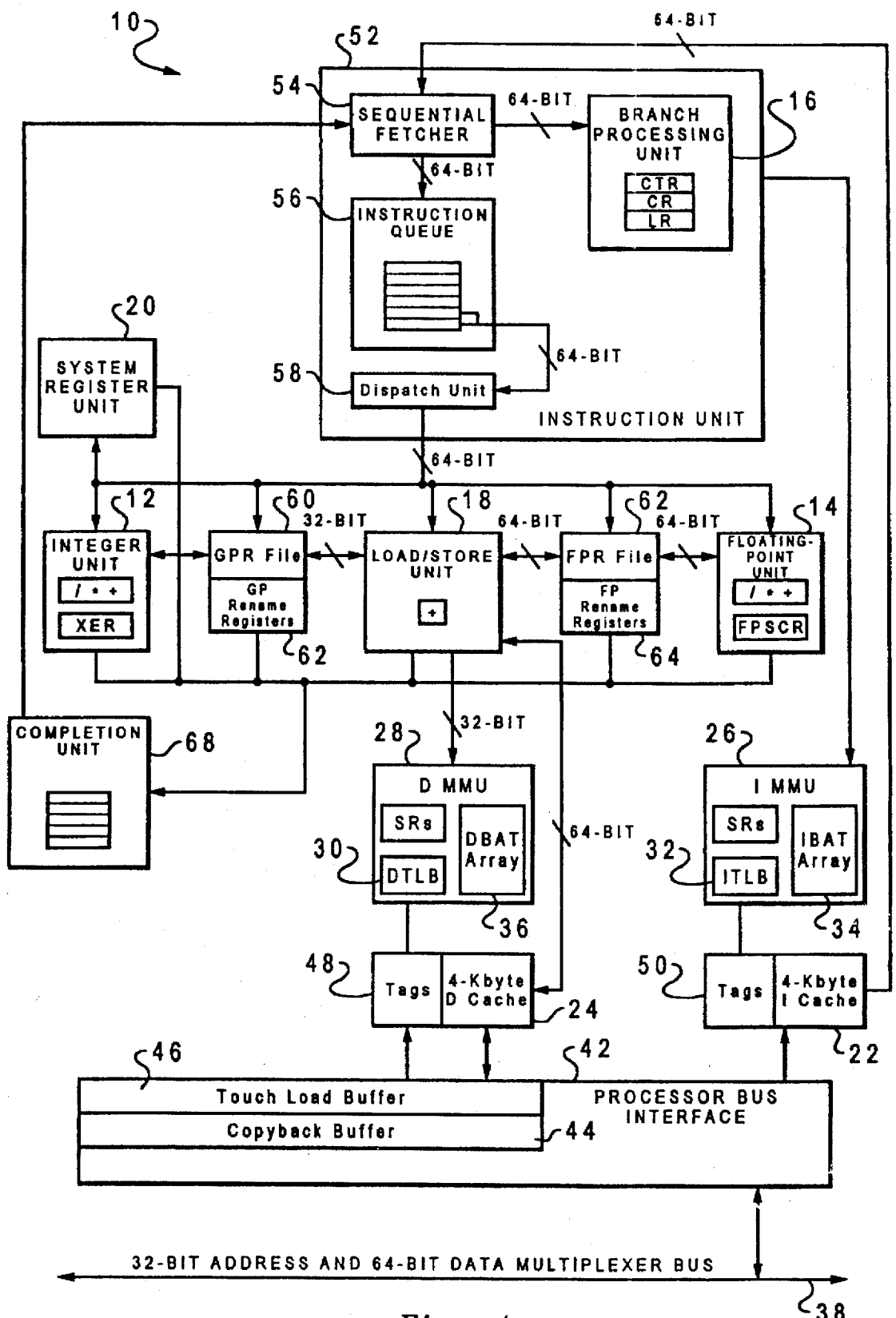
FIG. 1 depicts a block diagram of a representative microprocessor in accordance with a preferred embodiment of the present invention.

FIG. 1 depicts a block diagram of a representative microprocessor 10 upon which the present invention is implemented. Microprocessor 10 may be selected from, for example, the family of PowerPC RISC Processors. This particular microprocessor 10 implements a 32-bit architecture, which provides 32-bit effective addresses and floating point data types of 32 and 64 bits. Significantly, the processor can issue and retire as many as three instructions per clock cycle, where the instructions may be executed out-of-order for increased performance, but with completion appearing sequential for coherent and systematic operation.

Microprocessor 10 also includes five execution units, integer unit (IU) 12, floating point unit (FPU) 14, branch processing unit (BPU) 16, load-store unit (LSU) 18, and system register unit (SRU) 20. Microprocessor 10 also includes two physically addressed caches, one is an instruction cache 22 and the other is a data cache 24. Both caches are two-way set associative caches. Two memory management units (MMUs) are further included and consist of instruction MMU 26 and data MMU 28. Both MMUs contain 64-entry two-way set associative, data and instruction translation look aside buffers (DTLB and ITLB), 30 and 32, respectively, that provide support for demand-paged virtual memory addressed translation and variable-sized block translation. Microprocessor 10 also supports block address translation through the use of two independent instruction and data block address translation (IBAT and DBAT) arrays 34 and 36 of four entries each. Effective addresses are compared simultaneously with all four entries in the BAT array 34 and 36 during block translation.

Microprocessor 10 also includes a selectable multiplexed 32-bit address and 64-bit data bus 38. The interface protocol for microprocessor 10 allows multiple masters to compete for system resources through a central external arbiter. Bus 38 is connected to processor bus interface 42, which includes a copy-back buffer 44 and a touch load buffer 46. Processor bus interface 42 is further connected to the instruction cache 22, data cache 24, and tags unit 48 and 50, which are connected to data cache 24 and instruction cache 22, respectively. Instruction cache 22 is further connected to instruction Unit 52 while data cache 24 is connected to the load/store unit 18. Both instruction and data caches 22 and 24 are further connected to their respective memory management units 30 and 28 via their tags unit 48 and 50. Instruction fetching and issuing is handled in instruction unit 52. Translation of address for cache or external memory accesses is handled by the MMUs 28 and 30.

Instruction unit 52 also includes a sequential fetcher 54, instruction queue 56, dispatch unit 58 and batch processing unit 16, to provide centralized control of instruction flow to the execution units. Instruction unit 52 determines the address of the next instruction to be fetched based on information from the sequential fetcher 54 and from BPU 16.

Instruction unit 52 fetches instructions from instruction cache 22 into queue 56. BPU 16 extracts branch instructions from sequential fetcher 54 and uses static branch prediction on unresolved conditional branches to allow the instruction unit to fetch instructions from a predicted target instruction stream while a conditional branch is evaluated. Instruction queue 56 is designed to hold more than one instruction and can load more than one instruction from instruction unit 52 during a single cycle. Fetcher 54 continuously loads as many instructions as space in the instruction queue allows. Dispatch unit 58 performs source and destination register dependency checking, determines dispatch serializations, and inhibits subsequent instruction dispatching as required.

Branch processing unit 16 receives branch instructions from fetcher 54 performs condition register (CR) lookahead operations on conditional branches to resolve them early, achieving the effect of a zero cycle branch in many cases.

Load/store unit 18 executes all load and store instructions and provides the data transfer interface between general purpose registers (GPRs) 60, floating-point registers (FPRs) 62, and the cache/memory subsystem. Load/store unit 18 calculates effective addresses, performs data alignment and provides sequencing for load/store string and multiple instructions. Load and store instructions are issued and translated in program order; however, the actual memory accesses can occur out-of-order. Synchronizing instructions are provided to enforce strict ordering.

Cacheable loads, when free of data dependencies, execute in any speculative manner with a maximum throughput of once per cycle and a two-cycle total latency. Data removed from the cache is held in rename registers 64 and 66 until completion unit 68 commits the value to a GPR or FPR. Stores cannot be executed speculatively and are held in the store queue until completion unit 68 signals that the store operation is to be completed to memory. The time required to perform the actual load or store operation varies depending on whether the operation involves the cache, system memory, or an I/O device.

MMUs 34 and 36 support both virtual memory and physical memory for instruction and data. MMUs 34 and 36 also control access privileges for the spaces on block and page granularities. LSU 18 calculates effective addresses for data loads and stores, performs data alignment to and from cache memory, and provides the sequencing for load and store string and multiple word instructions. The instruction unit 52 calculates the effective addresses for instruction fetching.

After an address is generated, the higher-order bits of the effective address are translated by the appropriate MMU into physical address bits. Simultaneously, the lower-order address bits are directed to the caches where they form the index into the two-way set associative tag array. After translating the address, the MMU passes the higher-order bits of the physical address to the cache, and the cache lookup completes.

Cache units 22 and 24 each has a line size of 32 bits in length and provides a 64-bit interface to instruction fetcher 54 and load/store unit 18, respectively. The surrounding logic or tags 48 and 50, select, organize, and forward the pre-requested information to the requesting unit. Write operation to the cache can be performed on a byte basis, and a complete read-modify-write operation to the cache can occur in each cycle. Both load/store unit 18 and instruction fetcher 54 provide caches 24 and 22 with the address of the data or instruction to be fetched. In the case of a cache hit, the cache returns two words to the requesting unit.

The data cache tags 48 are single ported, simultaneous load or store and snoop accesses cause resource contention. Snoop accesses have the highest priority and are given first accesses to tags 48, unless the snoop access coincides with a tag write, in which case the snoop is retried and must be rearbitrated for access to the cache. Load or stores that are deferred due to snoop accesses are executed on the clock cycle following the snoop.

The present design of the caches 22 and 24 do not permit the broadcasting of the next address of the next bus transaction during the current transaction. If the system were able to broadcast the next address, or at least provide it for access during the current transaction, the system memory controller or memory management unit 28 and 30 can reduce the loss of speed in the initial memory access time of the memory outside of microprocessor unit 10. To accomplish this, a protocol is provided that uses a 32-bit address, and an 11-bit attribute, in a 64-bit data block illustrated in FIG. 2. The protocol provides that the next read address transaction is available during the address phase of the current write transaction.

Figure 2:
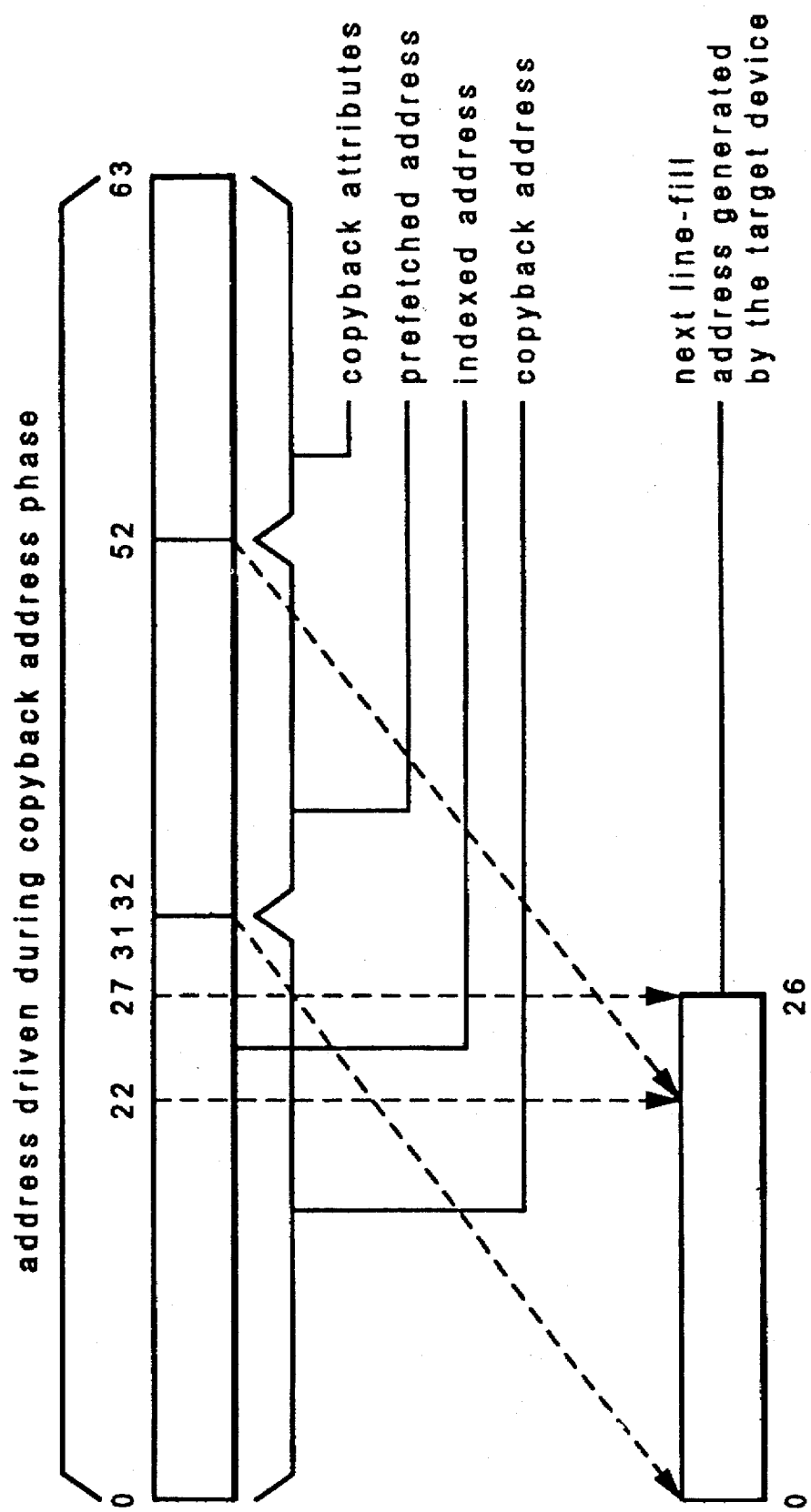
FIG. 2 is an address block generated using the present invention.

Specifically, during a cache transaction, such as when a cache read miss occurs at a modified cache line, the modified cache line is copied back to the main system memory. Next, the missed cache read line is loaded into the internal cache from main system memory. During the copy-back address phase, the address and attributes of the copy-back (write) transaction and upper address, called pre-fetched address, of the next line-fill (read) address are driven onto the system bus. Then, during the data phase of the copy-back transaction, the memory management unit or system memory controller forms the next fine-fill address by concatenating the pre-fetched address with a portion of the copy-back address, called index address, as shown in FIG. 2. The pre-fetched address serves as the tag entry of the next line-fill. The index address of the copy-beck is the address bits that are used to index into the internal cache, so the copy-back transaction and the line-fill transaction then sham the same index value.

The system memory controller generates the column and row address for the line-fill. Alternatively, the system memory controller can load the line-fill data into its buffers before the processor unit issues the line-fill transaction. This shortens the processor to main system memory cycle and increases the band width on the processor bus.

In the example of FIG. 2, the pre-fetched address is 21-bits wide end the indexed address is 6-bits wide because the internal cache is a 4k byte two-way set associative cache. For Other designs, the length of the pre-fetched and indexed address can be changed depending on the size of the internal cache, For example, an 8k byte two-way set associative cache would have a pre-fetched address of 20 bits and an indexed address of 7 bits, while a 16k two-way set associative cache would have a pre-fetched address of 19 bits and an indexed address of 8 bits.

The 64-bit data unit in FIG. 2 comprises a copy-back address that is 32-bits wide occupying the 0-31st bit positions. The indexed address is six bits wide and occupies the bit positions 22-27 within the copy-back address. The pro-fetched address is 21 bits wide and occupies bit positions 32-52 and is combined with the indexed address to serve as the next line-fill address, which is 27 bits wide. Finally, the copy-back attributes element is 11 bits wide and occupies bit positions 52-63.

Figure 3:
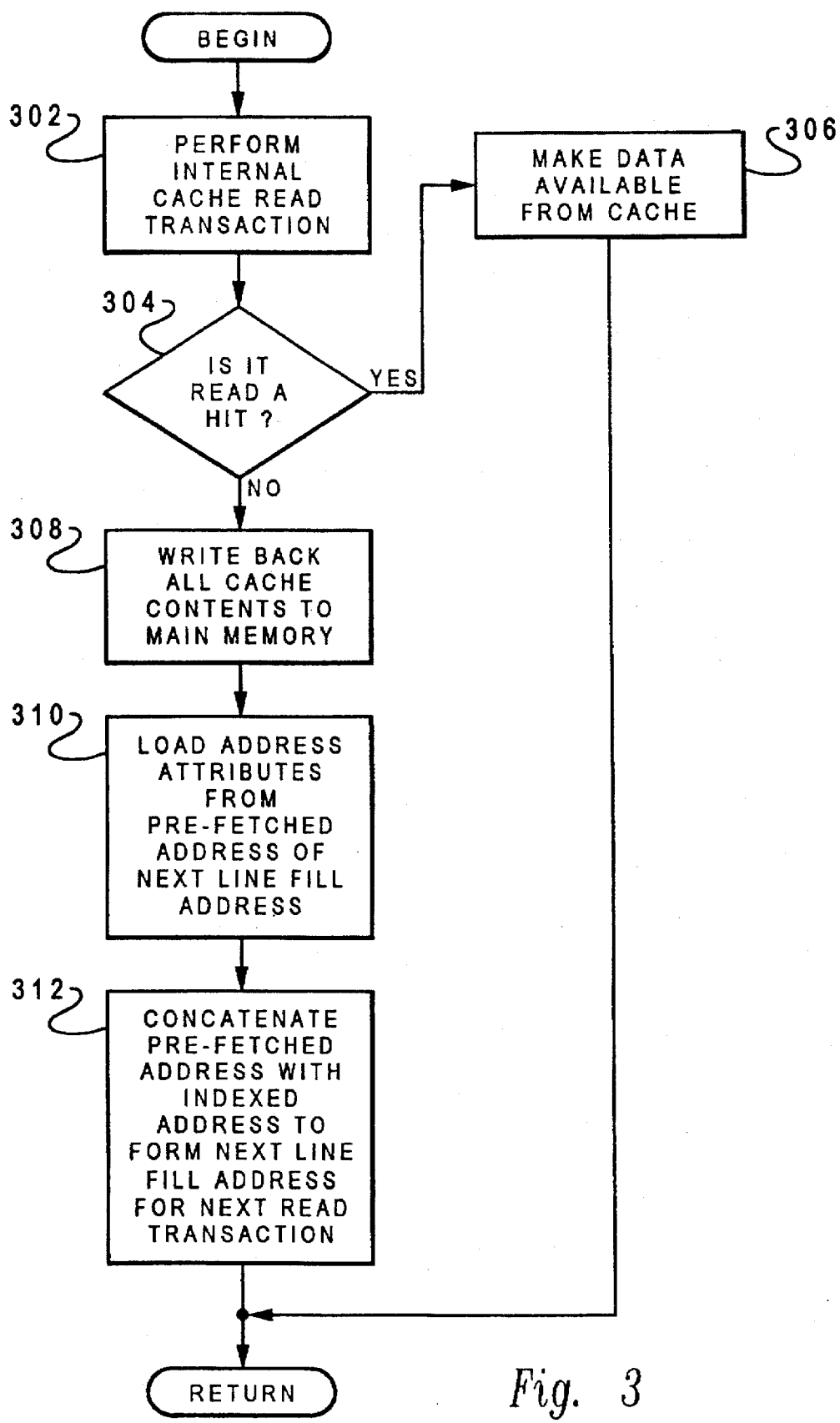
FIG. 3 depicts an example of the functional operation of the 64-bit data unit used to generate the line-fill address of FIG. 2.

An example of the functional operation of the 64-bit data unit used to generate the line-fill address by the target device, such as the memory controller, is depicted in the flowchart of FIG. 3. In step 302, the system performs an internal cache read transaction. If this read transaction is a hit in the internal cache in step 304, the data is made available by the internal cache in step 306. Otherwise, if a read miss occurs, the system proceeds to step 309. Since the processor needs to load data from system memory into the internal cache for the above read transaction, the processor has to write back from the internal cache to the system main memory the existing modified data in the internal cache to make space available for the above reed transaction. Accordingly, in step 308, the system writes back all the contents of the cache line to the system main memory.

During the address phase of this write transaction, the system, in step 310, loads the address and attributes of the copyback transaction and the upper address, called the pre-fetched address, of the next line fill address onto the system bus. In step 312, during the data phase of the copyback transaction, the pre-fetched address is concatenated with the indexed address portion of the copyback address to form the next line fill address. Now that the next read transaction address has been provided, the system memory controller can take advantage of the line fill address by loading the read data from system memory into its buffers. Thus, when the processor performs the read transaction, the memory controller can send the data to the processor immediately since it is already in the buffers.

While the invention has been particularly shown and described with reference to a preferred embodiment, it will be understood by those skilled in the art that various changes in form and detail may be made therein without departing from the spirit and scope of the invention.

We claim:

1. In a processing unit having a cache unit coupled to an address bus and a data bus, which are further connected to a system memory controller outside of said processing unit, a protocol for providing a next read address during the current write transaction, comprising the steps of:

loading the copyback address and attributes of the copyback transaction and a pre-fetched address of the next line-fill onto the system bus within a current data transaction; and generating a next line-fill address by concatenating said pre-fetched address with a portion of said copyback address.

2. The protocol according to claim 1 wherein said portion of said copyback address concatenated to said pre-fetched address is an indexed address.

3. The protocol according to claim 1 further comprising the step of:

generating a memory column and row addresses by the said system memory controller for the line-fill.

4. The protocol according to claim 1 further comprising the step of:

loading data of the a next read transaction from said system memory into the processing unit's buffer before the issuance of a line-fill transaction.

5. The protocol according to claim 1 further including:

determining if a cache read miss has occurred;

copying a modified cache line back to main memory unit providing that said cache read miss has occurred;

loading the missed cache read line resulting from the said cache read miss into internal cache from the said main memory unit.

6. A processing unit having a cache unit coupled to an address bus and a data bus, which are further connected to a system memory controller outside of said processing unit, a system for providing a next read address for the next transaction as provided during the address phase of a current write transaction comprising:

means, coupled to said cache units, for loading a copyback address and attributes of the copyback transaction and a pre-fetched address of the next line-fill onto the system bus within a current data transaction; and means, coupled to said loading means, for generating a next line-fill address by concatenating said pre-fetched address with a portion of said copyback address.

7. The system according to claim 6 wherein said portion of said copyback address concatenated to said pre-fetched address is an indexed address.

8. The system according to claim 6 further comprising the step of:

means, coupled to said generating means, for generating a memory column and row addresses by the said system memory controller for the line-fill.

9. The system according to claim 6 further comprising:

means, coupled to said generating means, for loading data of the said next read transaction from said system memory into the processing unit's buffer before the issuance of a line-fill transaction.

10. The system according to claim 6 further including:

means, coupled to said generating means, for determining if a cache read miss has occurred;

means, coupled to said determining means, for copying a modified cache line back to main memory unit providing that said cache read miss has occurred;

means, coupled to said generating means, for loading the missed cache read line resulting from said cache read miss into internal cache from said main memory unit.

* * * * *